Dec. 30, 1969           P. DUBBELMAN           3,486,689

ELECTRIC VENTILATOR

Filed March 4, 1968

INVENTOR.
PIETER DUBBELMAN

BY

AGENT

United States Patent Office 3,486,689
Patented Dec. 30, 1969

3,486,689
ELECTRIC VENTILATOR
Pieter Dubbelman, Leeuwarden, Netherlands, assignor, by mesne assignments, to U.S. Philips Corporation, New York, N.Y., a corporation of Delaware
Filed Mar. 4, 1968, Ser. No. 710,357
Claims priority, application Netherlands, Mar. 7, 1967, 6703547
Int. Cl. F04d 25/08; H02k 1/22
U.S. Cl. 230—259     5 Claims

ABSTRACT OF THE DISCLOSURE

An electric ventilator, having a motor with a laminated plate rotor and radially positioned impeller blades. The blade is affixed to a projecting plate from the rotor or can be formed by deforming the projecting plates itself.

---

The invention relates to an electric ventilator comprising a motor provided with an impeller, for use in a vacuum-cleaner, a floor-polisher and the like.

More particularly to a motor having a rotor with a diameter exceeding its length and made of thin sheet material plates provided with windings positioned so as to leave the peripheral surface of the rotor entirely free of the windings. The stator is located on either side of the rotor.

Although a motor of this general construction and relatively small dimension (flat-motor) is known when a ventilator is arranged on the rotor shaft the increase in the total overall length may be disadvantageous, especially when the motor is to be used in vacuum-cleaners, floor-polishers and similar apparatus.

This invention provides the advantages of using a so-called flat motor in vacuum-cleaners and similar apparatus, such as window-fans, wherein the length of the motor must be reduced to a minimum. In order to reduce the length, the impeller of a ventilator is arranged radially with respect to the outer periphery of the rotor plates.

A simple construction is obtained if, according to one embodiment of the invention, one or more of the rotor plates has a larger diameter than the remaining plates, and the blades are secured to this plate or plates, for example by screws, rivets, welds or other means.

However, according to another embodiment of the invention, the blades and a supporting ring may be manufactured from a non-magnetizable material such as synthetic resin or aluminium and this ring can be secured on the outer periphery of the rotor. This construction will facilitate the mass production of the motors.

According to another embodiment of the invention, one of the rotor plates has a larger diameter than the remaining plates and the part of this plate projects beyond the remaining plates, and is deformed to form an impeller. This construction may be less expensive and is also suitable for mass production, especially if, according to a further embodiment of the invention, the larger plate is an end plate of the rotor packet.

An object therefore of this invention is to reduce the overall length of the motor by positioning the impeller blades radially with respect to the rotor.

Another object of this invention is to utilize the laminated plates of the rotor for supporting the impeller blade.

A further object of this invention is to utilize the laminated plates of the rotor to form impeller blades.

The above and other objects, features and advantages of the present invention will be apparent from the following description of the preferred embodiments when considered in connection with the accompanying drawing wherein.

Figure 1:
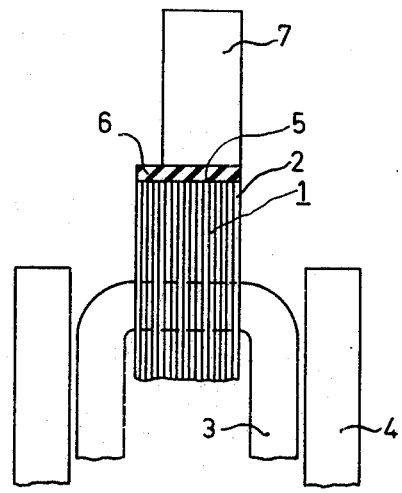
FIGURE 1 is a cross-sectional view of part of a laminated rotor provided with an impeller made of synthetic resin.
Figure 2:
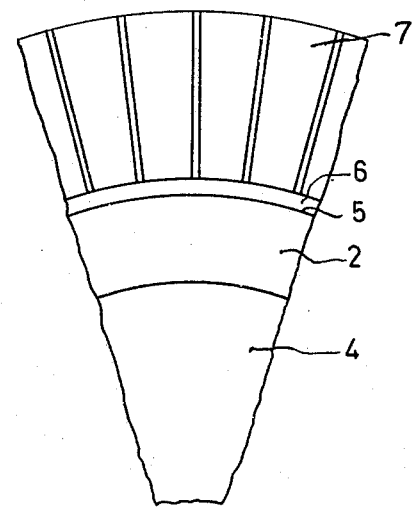
FIGURE 2 is a front elevation.
Figure 3:
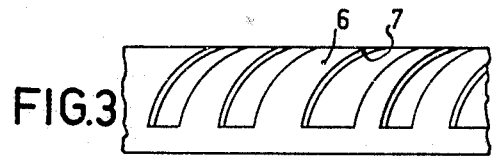
FIGURE 3 is a plan view of the rotor of FIGURE 1.

In FIGURES 1, 2 and 3, reference numeral 1 denotes a part of a rotor consisting of plates 2, windings 3 and stators 4 disposed on the outer sides. The outer periphery 5 of the rotor 1 is surrounded by a ring 6 of synthetic resin on which blades 7 are disposed. The ring 6, which may be arranged around the rotor, for example, by shrinkage or which may be anchored on the plates 2 by projecting parts, is integral with the blades 7. It will be appreciated that a flat ventilator is thus obtained, which is particularly suitable, for example, to be arranged in a flat vacuum-cleaner.

Figure 4:
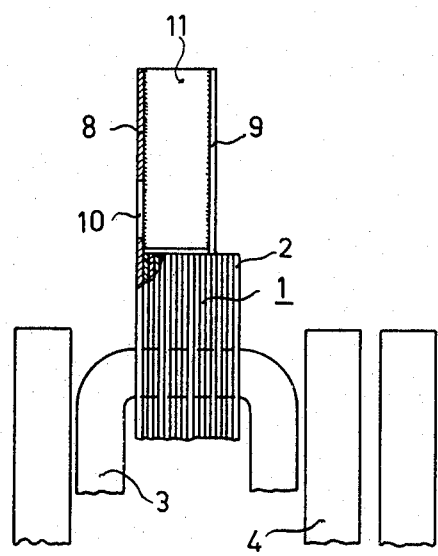
FIGURE 4 is a cross-sectional view of part of a laminated rotor, in which blades are provided between two lengthened plates.

In FIGURE 4, the rotor 1 again consists of plates 2. In this case, however, two plates 8 and 9 have a larger diameter than the remaining plates. The plate 8 is provided with apertures 10. Blades 11 are welded to the plates 8 and 9. The plates 8 and 9 may also be located differently; these plates may be, for example, two end plates.

Figure 5:
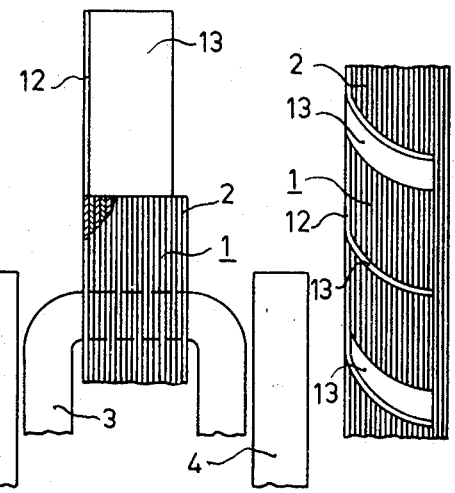
FIGURE 5 is again a cross-sectional view of part of a laminated rotor, in which blades are formed from one of the plates.
Figure 6:
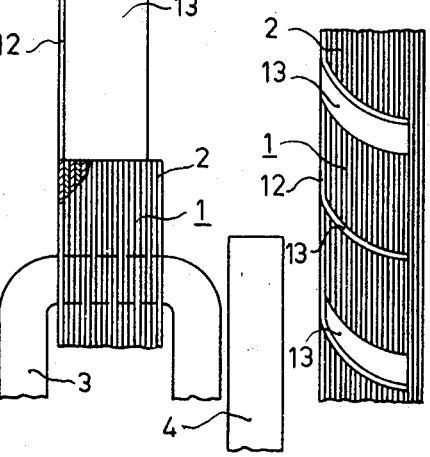
FIGURE 6 is a plan view of FIGURE 5.

In FIGURE 5, one end plate 12 of the rotor 1 has a larger diameter and is deformed so that blades 13 are bent out of it and engage on the lower side the periphery of the rotor. This construction is particularly suitable for mass production. Also in this case, the plate with blades 13 need not be an end plate.

A ventilator in accordance with the invention is particularly suitable to be used not only as a vacuum-cleaner ventilator, but also in a conventional ventilator aggregate such as a window-fan and the like, because its overall thickness may be small.

What is claimed is:

1. An electric ventilator comprising a motor having a rotor formed from a plurality of laminated plates, at least one of which extends radially beyond the other plates, windings positioned around the rotor, stators located adjacent the rotor, and an impeller blade operatively associated with said extended plate.

2. An electric ventilator as claimed in claim 1 wherein two of the laminated plates extend radially beyond the other plates, and an impeler blade is secured to and between the extended plates.

3. An electric ventilator as claimed in claim 2 wherein at least one of the radially extended plates has an aperture defined therein.

4. An electric ventilator comprising a motor having a rotor formed from a plurality of laminated plates, windings positioned around the rotor, stators located adjacent the rotor, and a radially extension of at least one of the laminated plates beyond the other plates, said extended plates being deformed to the shape of an impeller blade.

5. An electric ventilator as claimed in claim 4 wherein the radially extended plate is an end plate of the laminated rotor.

References Cited

UNITED STATES PATENTS

| | | | |
|---|---|---|---|
| 2,031,688 | 2/1936 | Bowen | 230—259 |
| 2,734,140 | 2/1956 | Parker | 310—268 |
| 2,829,287 | 4/1958 | Soler Font | 230—259 |
| 2,885,579 | 5/1959 | Lemp. | |

LEONARD H. GERIN, Primary Examiner

U.S. Cl. X.R.

310—268